United States Patent [19]

Leidenfrost

[11] 4,404,855
[45] Sep. 20, 1983

[54] HIGH SENSITIVE MICROMANOMETER

[75] Inventor: Wolfgang Leidenfrost, West Lafayette, Ind.

[73] Assignee: Purdue Research Foundation, West Lafayette, Ind.

[21] Appl. No.: 311,509

[22] Filed: Oct. 15, 1981

[51] Int. Cl.³ .............................................. G01L 7/18
[52] U.S. Cl. .................................................... 73/747
[58] Field of Search ...................... 73/747, 861.49, 748; 116/266

[56] References Cited

U.S. PATENT DOCUMENTS 2,509,327 5/1950 Young .................................. 73/747
2,684,593 7/1954 Rothstein ............................ 73/747

*Primary Examiner*—Donald O. Woodiel
*Attorney, Agent, or Firm*—O'Rourke & Harris

[57] ABSTRACT

An instrument wherein the downwards or upwards displacement of menisci under the action of a pressure differential in a U-tube arrangement is magnified by a factor of $10^4$ or more. This measurement precision is accomplished by determining the volume of manometer fluid displaced via the observation of motion of an air bubble inside a horizontal capillary tube connecting the large and equal diameter vertical legs of a manometer.

2 Claims, 3 Drawing Figures

HIGH SENSITIVE MICROMANOMETER

FIELD OF THE INVENTION

This invention relates to an improved manometer of high sensitivity.

BACKGROUND OF THE INVENTION

There are numerous situations in industry and research where pressures or pressure differentials must be measured for the determination of flow rates, velocities, state properties of substances and for many other reasons. This invention comprises a new, simple and inexpensive device for the very sensitive determination of pressure differentials.

SUMMARY OF THE INVENTION

Two embodiments (one using a straight horizontally disposed capillary tube shown in FIG. 1) and another using a coiled capillary tube (shown in FIG. 2) are disclosed.

Both embodiments have as their object the provision of a highly sensitive manometer of low cost, and the embodiment that uses the coiled capillary has the further advantage that the coil is substantially gravity independent so the sensitive spatial orientation of prior art manometer devices is not critical in this embodiment of the device.

DESCRIPTION OF THE INVENTION

Figure 1:
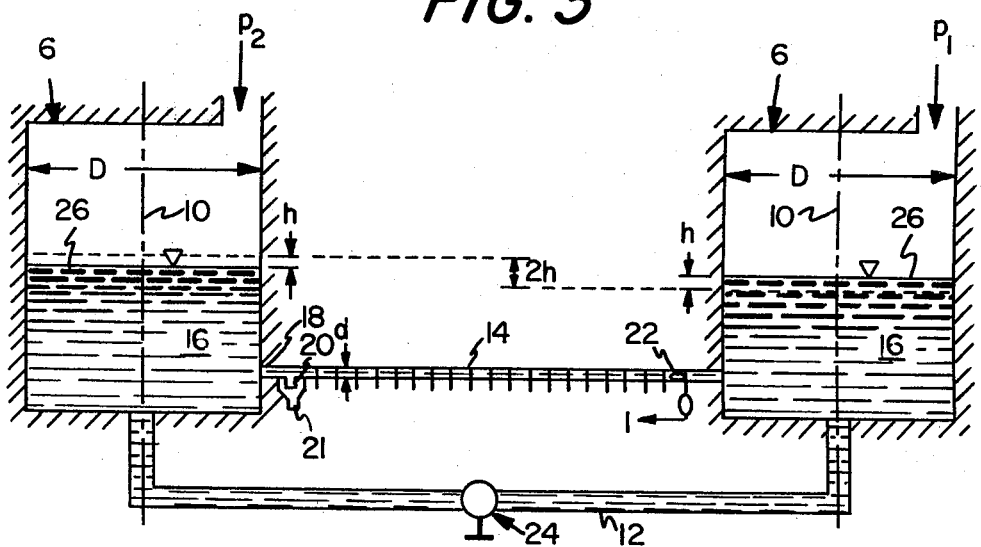
FIG. 1 is a schematic side view representation of one embodiment of the device.

Two cylindrical thermally well insulated reservoirs 6,6 of identical diameter D are placed such that their axes 10 are vertical. The reservoirs 6,6 are connected by a large bore tube 12 at the bottom and by a horizontal capillary tube 14 of diameter d. The two reservoirs 6, the capillary 14 and the large bore tube 12 are filled with a manometer fluid 16. Due to the connecting lines 12 and 14 the liquid surface level 26, 26 within the reservoirs will be in the same horizontal plane when $p_1 = p_2$. Near the left end 18 of the capillary tube 14 is fused a short tube 20 capped by a rubber sleeve 21 (septum) allowing introduction of an air bubble 22 by means of a hypodermic needle (not shown). Closing the valve 24 in the large bore connecting tube 12 and pressurizing one reservoir 6 (the one shown on the left in FIG. 1) slightly will push the bubble 22 towards the right (as shown in FIG. 1) until a desired position is reached. The valve 24 is now opened and the liquid surface levels 26 within the two legs of the manometer will again adjust to a common horizontal plane. During the adjustment the air bubble 22 will move only a small distance towards the left (as shown in FIG. 1) due to the fact that flow through the large bore tube 12 is many times less restricted by viscous effects than in the capillary tube 14. Closing the valve 12 and recording the location of the bubble 22 makes the instrument ready for measurements.

Pressurizing the right reservoir 6 to a pressure $p_1$ and the left reservoir 6 to a smaller pressure $p_2$ causes the liquid surface level 26 in the right reservoir to recede by a distance h. The liquid volume displaced pushes the air bubble 22 towards the left. For small values of $(p_1 - p_2)$ the air in the bubble can be considered incompressible, therefore, the same volume entering the capillary at its right end is equal the volume leaving the capillary at its left end. Since the diameter of the left reservoir is equal to that of the right, the liquid level will move upwards by the same distance h when the surface tension effects at the wetted perimeters of the reservoirs can be assumed to be identical. The pressure differential $(p_1 - p_2)$ is equal $2h \times$ density of manometer fluid. The fluid can be considered incompressible and $D^2 h = d^2 l$, where l is the displacement of the bubble. The ratio $D^2/d^2$ easily can be selected to be $10^4$ or more. Assuming a ratio of $10^4$ indicates that a 1 mm bubble displacement is caused by a displacement of the liquid level $h = 10^{-4}$ mm. By optical means it is rather easy to determine the bubble displacement within 0.1 mm, namely, h can be determined within $10^{-5}$ mm and therefore the new micromanometer makes it possible to determine pressure differentials as sensitive as $$\Delta p = 2 \times 10^{-5} \rho_{MF}/\rho_{H_2O} [\text{mm H}_2\text{O}]$$

Using ethylalcohol as manometer fluid ("MF"=AL) (for reasons of its relative low surface tension) yields a sensitivity of $$\Delta P = 2\rho_{Al}/\rho_{H_2O} \times 10^{-5} [\text{mm H}_2\text{O}]$$

This value is correct only for the assumption that the bubble acts as a leakfree piston, which is the case for a bubble 5-10 times longer than its diameter and for homogeneous wettability or uniform surface characteristics of the capillary. Under these conditions the movement of the bubble will also not be restricted by surface tension effects because the capillary forces at both menisci are identical and opposite to each other. The bubble, therefore, acts as a leak-free and "frictionless" piston. The rate of motion of the bubble, however, is influenced by friction due to the viscosity of the manometer fluid and therefore the rate of bubble displacement can be influenced by the selection of the diameter d of the capillary. This in turn dictates the diameter D of the reservoir for a desired magnification factor $D^2/d^2$.

The sensitivity of $\Delta p$ given above is also influenced by surface tension effects of the liquid wetting the walls of the reservoirs. Such effects become smaller with increasing values of D and for the conditions for the wettability of the walls can be made identical in both reservoirs. This can be achieved by selecting the same materials of the walls and by identical surface operations. The latter requirement is difficult to accomplish and experimental verification might be required.

Connecting the reservoirs to the total pressure and static pressure ports of a Pitot-tube allows the velocity of an air stream (or of other media), to be measured. A one millimeter displacement of the air bubble indicates a velocity of the air under standard state conditions of $$u \approx 5 \text{ cm/sec}$$

In order to allow velocity measurements in the m/sec range a rather long capillary must be provided. Selecting a five meter length makes it possble to measure air velocities up to ~3.5 m/sec. A capillary of such length cannot be used conveniently when straight; it must be coiled instead. An arrangement of this kind is shown in FIG. 2 where the five meter long capillary 30 is placed on a square area of 40 cm side length.

The innermost coil 32 has a radius of 100 mm which is large enough to avoid changes of bore diameter of the capillary during bending. Coiling the capillary in one plane brings the advantage that it does not need to be leveled. The bubble cannot be displaced by buoyancy forces even when the mounting board is off horizontal. Coiling on the other hand brings the disadvantage that the bubble movement within the capillary follows a path of constantly changing curvature and a scale of equal straight line subdivisions in principle cannot be applied. For the innermost coil the curved path, however, is only 0.0004 cm longer than the 1 cm straight line path. The difference becomes increasingly smaller with increasing bending diameter. Therefore, a scale 34 can be provided by equal straight line (1 cm long) subdivisions along the center line of the capillary tube. Such arrangement in addition makes it possible to determine the location of the bubble by optical means.

Figure 2:
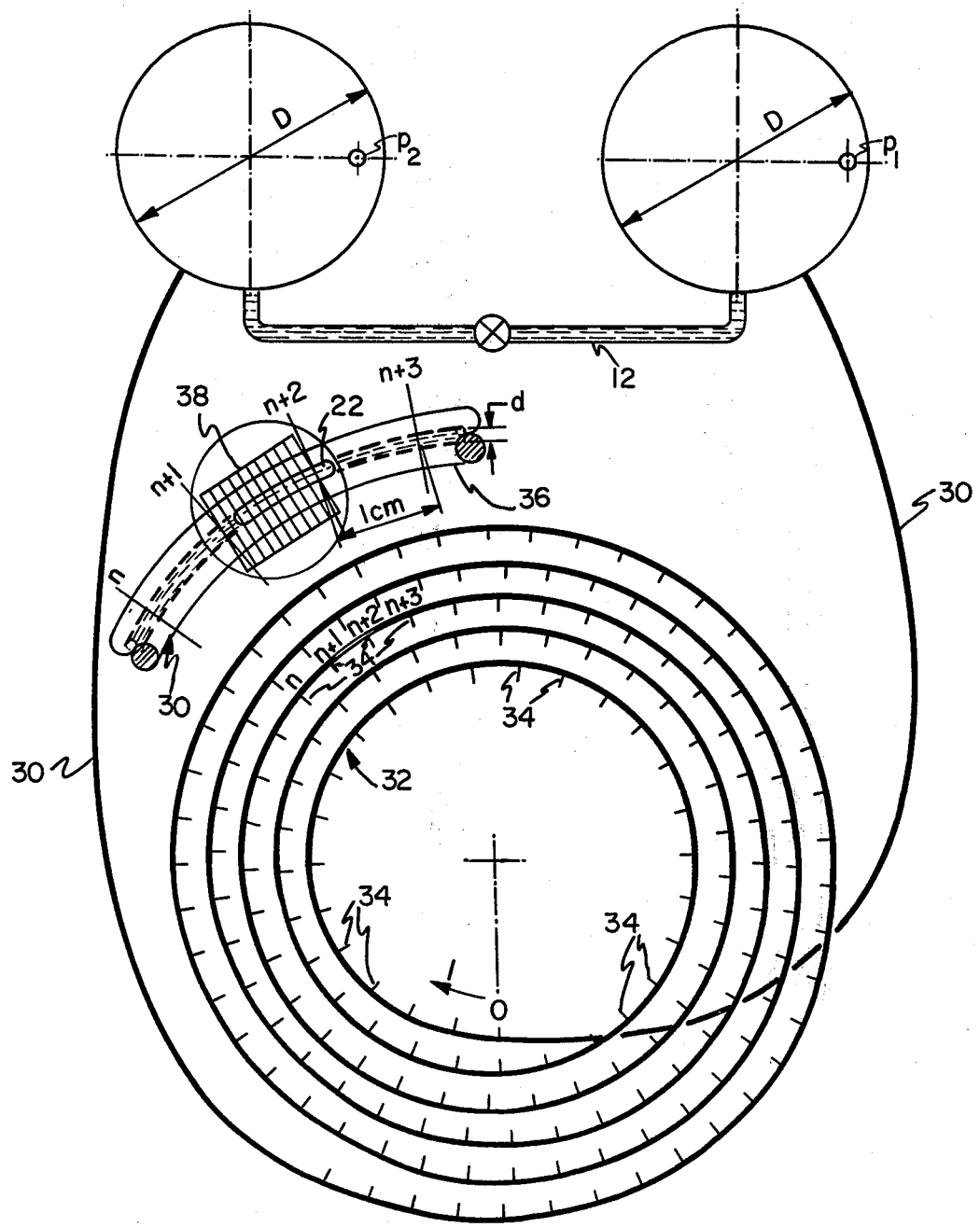
FIG. 2 is a schematic top view representation of another embodiment of the device.

The magnified insert 36 of FIG. 2 shows a 1 cm scale 38 with a 1 mm subdivision focused onto the plane through the axis of the capillary and lined up with the lines n+1 and n+2 of the capillary scale. The reading indicates that the bubble has moved under the action of a pressure differential n+1 cm plus 1.5 mm away from its starting position where the trailing edge was at zero. Obviously, an optical scale with a smaller subdivision and/or with a vernier arrangement can be provided for a more precise determination of the location of the bubble.

To move the bubble through the total length of the coiled capillary 30 requires a $\Delta p \sim 1$ mm $H_2O$. Obviously, there are many situations were a larger pressure differential must be measured. The instrument described so far can be modified easily to allow also the observation of larger $\Delta p$'s by just providing another manometer tube. The lower end of this tube is connected to one of the reservoirs 6 somewhat below the liquid level. The other end is connected to the gas space above the liquid level in the other reservoir. This latter connection can be made by means of flexible tubing which allows the manometer tube to be inclined at various angles off horizontal. The instrument can then be used as a common micromanometer. Obviously two valves must be provided in addition, to assure that the liquid enters only the manometer tube or only the capillary tube during the respective modes of operation.

Figure 3:
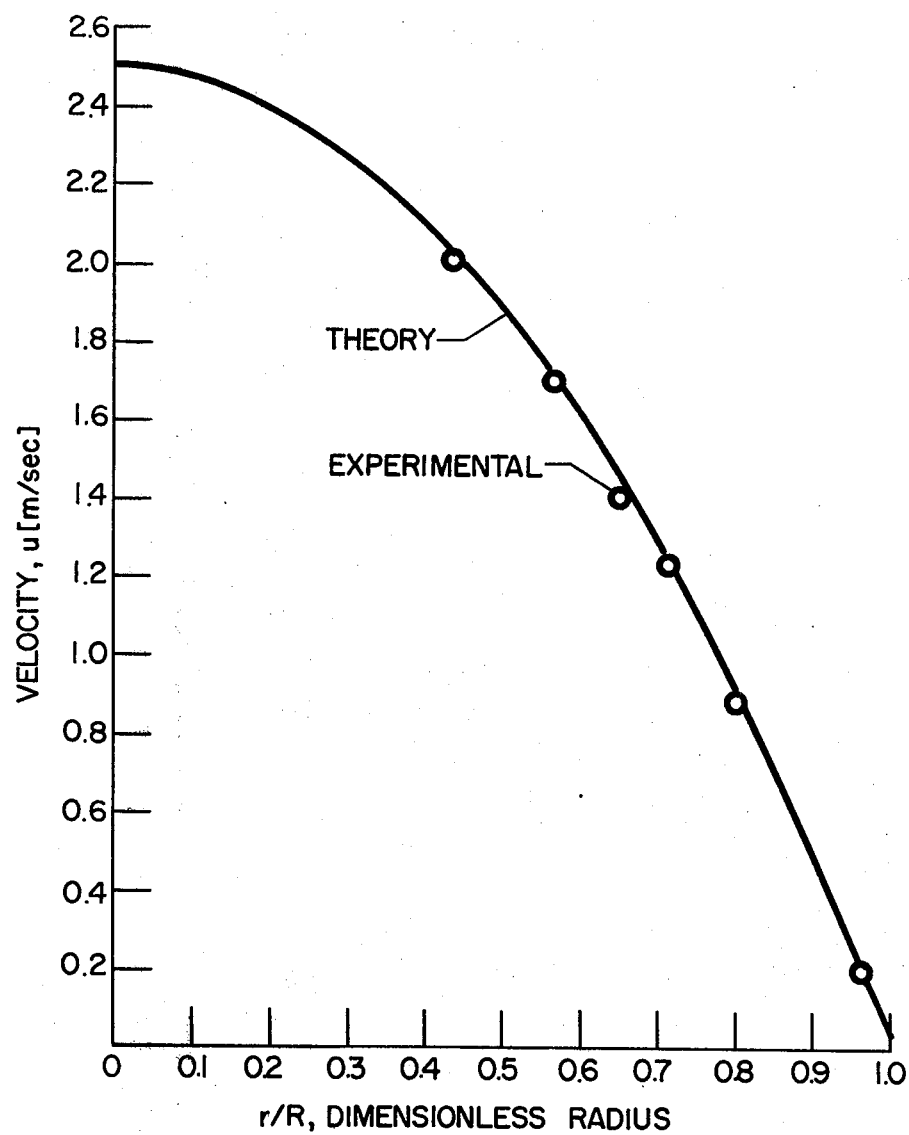
FIG. 3 is a graph showing the velocity profile during laminar tube flow both as measured by the present device (marked "Experimental") and plotted according to mathematical theory (marked "Theory").

An instrument like that shown in FIG. 2 has been built for the measurement of velocity profiles in laminar tube flow. In order to check the influence of wettabilities of the reservoir walls the instrument was calibrated with the aid of a precision micromanometer model 34FB2 of Meriam Instrument Company. Equal $\Delta p$ increments produced equal displacements of the bubble. The bubble always returned to its original position after $\Delta p$ was adjusted to zero again. The bubble displacement, in addition, was equal to the value predicted for the $\Delta p$'s in the system of fixed magnification factor $D^2/d^2$. The rate of bubble motion was rather low, which can be attributed to the small diameter of 1 mm selected for the capillary. Increasing the diameter of the capillary to $d_1$ will lower the viscous effects and will make the bubble move faster toward its final position despite the fact that a larger volume must be displaced when $D_1^2/d_1^2$ is maintained equal to $D^2/d^2$. FIG. 3 shows velocity u plotted versus dimensionless location r/R in laminar flow of air. The excellent agreement of the measured data with theory demonstrates the usefulness of the new high sensitive device.

Other constructions of the invention disclosed will be readily apparent to those skilled in the art.

What is claimed is:

1. A high sensitivity micromanometer comprising:
first and second vertically disposed monometer legs of large and equal diameter, each with pressure access ports and having a liquid contained therein;
a coiled capillary tube interconnected between said first and second momometer legs;
a tube having a large diameter interconnected between said first and second manometer legs;
valve means for equalizing the level of a liquid contained in said manometer legs in the same horizontal plane by regulation of the flow of said liquid through said large diameter tube connected between said legs;
septum means connected to said coiled capillary tube for introduction of a gas bubble therein;
scale means for measuring the displacement of said gas bubble; and
whereby pressure differentials between said pressure access ports are magnified on the order of at least $10^4$.

2. The manometer according to claim 1 in which the said liquid is ethylalcohol.

* * * * *